(12) United States Patent
Tseng

(10) Patent No.: US 8,055,190 B2
(45) Date of Patent: Nov. 8, 2011

(54) APPARATUS AND METHOD FOR TRANSFORMING AND TRANSMITTING SIGNAL

(75) Inventor: Wei-Lin Tseng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 370 days.

(21) Appl. No.: 12/436,789

(22) Filed: May 7, 2009

(65) Prior Publication Data

US 2010/0035560 A1 Feb. 11, 2010

(30) Foreign Application Priority Data

Aug. 6, 2008 (TW) .............................. 97129837 A

(51) Int. Cl.
*H04B 7/14* (2006.01)
(52) U.S. Cl. .......................................... 455/15; 455/102
(58) Field of Classification Search .................. None
See application file for complete search history.

(56) References Cited

U.S. PATENT DOCUMENTS

| 7,010,325 | B1 | 3/2006 | Oh |
| 7,200,368 | B1 * | 4/2007 | Hottinen et al. ............. 455/101 |

* cited by examiner

*Primary Examiner* — Cassandra Cox
(74) *Attorney, Agent, or Firm* — Jianq Chyun IP Office

(57) ABSTRACT

A signal transforming and transmitting apparatus and a signal transforming and transmitting method are provided. The signal transforming and transmitting apparatus includes a processing chip, and a signal dividing/integrating unit. The processing chip defines a signal-download period and a signal-upload period according to a clock signal. The signal dividing/integrating unit is coupled to the processing chip, and is adapted for dividing a wired downloading signal from a wireless downloading signal transmitted from the base station during the signal-download period, and transmitting the wired downloading signal and the wireless downloading signal to corresponding downstream devices. The signal dividing/integrating unit is adapted for integrating a wired uploading signal and a wireless uploading signal into an integrated wireless uploading signal and transmitting the integrated wireless uploading signal to the base station, during the signal-upload period. In such a way, the present invention avoids the interference caused by overlaps between uploading and downloading operations.

18 Claims, 3 Drawing Sheets

APPARATUS AND METHOD FOR
TRANSFORMING AND TRANSMITTING
SIGNAL

CROSS-REFERENCE TO RELATED
APPLICATION

This application claims the priority benefit of Taiwan application serial no. 97129837, filed on Aug. 6, 2008. The entirety of the above-mentioned patent application is hereby incorporated by reference herein and made a part of this specification.

BACKGROUND OF THE INVENTION

1. Field of the Invention

The present invention generally relates to a signal transforming and transmitting apparatus, and more particularly, to a signal transforming and transmitting apparatus adapted for transforming between a wired signal and a wireless signal, and a signal transforming and transmitting method thereof.

2. Description of Related Art

Recently, internet has become more popularized than ever before, and more multimedia information are accessible from the internet. Therefore, the demands of users for network transmission rate are drastically increased. For example, a present wired network may even achieve a transmission rate up to 1000 Mbps. However, a wired network is usually featured with a poor mobility, and a user using the wired network is often restricted by the layout of the wiring network and cannot use the wired network when moving. As a solution provided addressing to this disadvantage, wireless network techniques are developed. Although the transmission rate and the reliability of a typical wireless network are usually less than that of a typical wired network, the wireless network advantageously eliminates the wiring layout and the location restriction, thus enhancing the share of wireless networks in the market.

Wireless networks are creatively developed and innovated, and more and more kinds of wireless networks are provided to the users for selection. For example, from the earliest Institute of Electrical and Electronics Engineers (IEEE) 802.11 wireless network, to the current 3G ($3^{rd}$ generation) wireless network, or even to the worldwide interoperability for microwave access (WiMAX) wireless network, the transmission rate and reliability are continuously improved, and the signal transmission distance for providing service is improved from several meters to several kilometers.

Generally, a user can select to use a modem or a repeater for accessing services provided by wireless network service suppliers. The operation mode of the modem is receiving wireless signals provided by the wireless network service supplier, thus obtaining a frequency bandwidth, and then connecting a network interface of a user end via a wiring layout. The modem transforms between wireless signals and wired signals, by which the user can get access to the wireless network. As to the repeater, it receives wireless signals from the wireless network service supplier, and then transmits received wireless signal out. Differing from the modem, the repeater eliminates the necessity of wiring layout, and further expands the coverage region of the service provided by the wireless network service supplier, thus improving the convenience of enjoying the wireless network service.

However, viewing from the standpoint of users, although wired signals are more reliable than wireless signals, the wiring layout restricts the application range thereof. On the contrary, even though wireless signals provide better mobility, in that the wireless network can be accessed at anywhere covered by the repeater, the wireless signals are less reliable than the wired signals. As such, the foregoing two approaches of accessing a wireless network are featured with their own advantages and disadvantages, respectively. When considering the cost factor, a wireless network service supplier often cannot afford offering both a repeater and a modem for free to the user. As such, if a user desires not only steady signals, but also convenient accessing to the network, he has to buy a repeater or a modem on his own. Therefore, it introduces additional expense. Further, it is inconvenient of simultaneously carrying both of the two apparatuses, which also occupied a large room, thus bringing further inconvenience to the user.

SUMMARY OF THE INVENTION

Accordingly, the present invention is directed to provide a signal transforming and transmitting apparatus, adapted for transforming and transmitting a signal between a base station and wired and wireless downstream devices.

The present invention is further directed to provide a signal transforming and transmitting method, adapted for transmitting a signal from a base station to wired and wireless downstream devices, and transmitting a signal from the wired and wireless downstream devices back to the base station.

The present invention provides a signal transforming and transmitting apparatus. The signal transforming and transmitting apparatus includes a processing chip, and a signal dividing/integrating unit. The processing chip defines a signal-download period and a signal-upload period according to a clock signal. The signal dividing/integrating unit is coupled to the processing chip, and is adapted for dividing a wired downloading signal from a wireless downloading signal transmitted from the base station during the signal-download period, and transmitting the wired downloading signal and the wireless downloading signal to corresponding downstream devices, respectively. The signal dividing/integrating unit is further adapted for integrating a wired uploading signal and a wireless uploading signal transmitted from the downstream devices into an integrated wireless uploading signal and transmitting the integrated wireless uploading signal to the base station, during the signal-upload period.

According to an embodiment of the present invention, the processing chip defines a former semi-period or a latter semi-period of the clock signal as the signal-download period, and defines the rest semi-period as the signal-upload period.

According to an embodiment of the present invention, the base station is adapted for controlling the processing chip to adjust a proportion between lengths of the former semi-period and the latter semi-period of the clock signal, according to a network transmission condition.

According to an embodiment of the present invention, the signal dividing/integrating unit is adapted for transmitting the wireless downloading signal and the wired downloading signal to the corresponding downstream devices, according to a connection status of each of the downstream devices.

According to an embodiment of the present invention, the signal transforming and transmitting apparatus further includes a first antenna, a second antenna, and a wired signal transceiver unit. The downstream devices include at least a wired downstream device and at least one wireless downstream device. The first antenna is adapted for communicating with the base station via a wireless network, thus receiving the wireless downloading signal, and transmitting the integrated wireless uploading signal. The second antenna is adapted for communicating with the wireless downstream device via the wireless network, for transmitting the wireless downloading signal and receiving the wireless uploading signal. The wired signal transceiver unit is adapted for communicating with the wired downstream device via a wired network for receiving the wired uploading signal, and transmitting the wired downloading signal.

According to an embodiment of the present invention, the foregoing signal dividing/integrating unit includes a first amplifier, a second amplifier, a dividing unit, and an integrating unit. The dividing unit is coupled to the first amplifier. The integrating unit is coupled to the dividing unit and the second amplifier. During the signal-download period, the first amplifier amplifies the wireless downloading signal, and the dividing unit divides the wired downloading signal from the amplified wireless downloading signal. Then, the wired signal transceiver unit transmits the wired downloading signal to the wired downstream device. The integrating unit transmits the wireless downloading signal to the second amplifier for amplifying. The second antenna transmits the wireless downloading signal to the wireless downstream device. During the signal-upload period, the first amplifier amplifies the wireless uploading signal and the dividing unit transmits the amplified wireless uploading signal to the integrating unit. The integrating unit integrates the wired uploading signal and the amplified wireless uploading signal into an integrated wireless uploading signal. The second amplifier amplifies the integrated wireless uploading signal, and transmits the amplified integrated wireless uploading signal to the base station via the first antenna.

According to an embodiment of the present invention, the first amplifier includes a low noise amplifier (LNA).

According to an embodiment of the present invention, the second amplifier includes a power amplifier (PA).

According to an embodiment of the present invention, the wireless network includes a worldwide interoperability for microwave access (WiMAX) wireless network, a 3G wireless network, a 3.5G wireless network, or a long term evolution (LTE) wireless network.

According to an embodiment of the present invention, the wired network includes an Ethernet network.

The present invention further provides a signal transforming and transmitting method, for receiving and transmitting signals between a base station and at least one downstream device. The method includes the following steps. First, a signal-download period and a signal-upload period are defined according to a clock signal of a processing chip. Then, during the signal-download period, a wired downloading signal is divided from a wireless downloading signal transmitted from the base station. Thereafter, the wired downloading signal and the wireless downloading signal are transmitted to corresponding downstream devices. During the signal-upload period, a wired uploading signal and a wireless uploading signal transmitted from the downstream devices are integrated into an integrated wireless uploading signal. The integrated wireless uploading signal is then transmitted back to the base station.

According to an embodiment of the present invention, the step of defining the signal-download period and the signal-upload period according to the clock signal of the processing chip includes defining a former semi-period or a latter semi-period of the clock signal as the signal-download period, and defining the rest semi-period as the signal-upload period.

According to an embodiment of the present invention, the signal transforming and transmitting method further includes controlling the processing chip with the base station to adjust a proportion between lengths of the former semi-period and the latter semi-period of the clock signal, according to a network transmission condition.

According to an embodiment of the present invention, the step of transmitting the wireless downloading signal and the wired downloading signal to the corresponding downstream devices is performed according to a connection status of each of the downstream devices.

According to an embodiment of the present invention, the method further includes amplifying the wireless downloading signal with a low noise amplifier (LNA) during the signal-download period, dividing a wired downloading signal from the amplified wireless downloading signal and transmitting the wired downloading signal to the wired downstream device, and amplifying the wireless downloading signal with a power amplifier (PA), and transmitting the amplified wireless downloading signal to the wireless downstream device.

According to an embodiment of the present invention, the method further includes amplifying the wireless uploading signal with a low noise amplifier (LNA) during the signal-upload period, integrating a wired uploading signal with the amplified wireless uploading signal into an integrated wireless uploading signal, and amplifying the integrated wireless uploading signal with a power amplifier (PA), and transmitting the amplified integrated wireless uploading signal to the base station.

According to an embodiment of the present invention, the wireless downloading signal and the wireless uploading signal are worldwide interoperability for microwave access (WiMAX) wireless network signals, 3G wireless network signals, 3.5G wireless network signals, or long term evolution (LTE) wireless network signals.

According to an embodiment of the present invention, the wired network downloading signal and the wired uploading signal are Ethernet signals.

The signal transforming and transmitting apparatus and the method according to the present invention define a signal-download period and a signal-upload period, respectively, according to a clock signal provided by a processing chip. Hence, the present invention performs signal dividing and downloading operations during the signal-download period, and performs signal integrating and uploading operations during the signal-upload period. In such a way, the present invention avoids the interference caused by overlaps between uploading and downloading operations.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
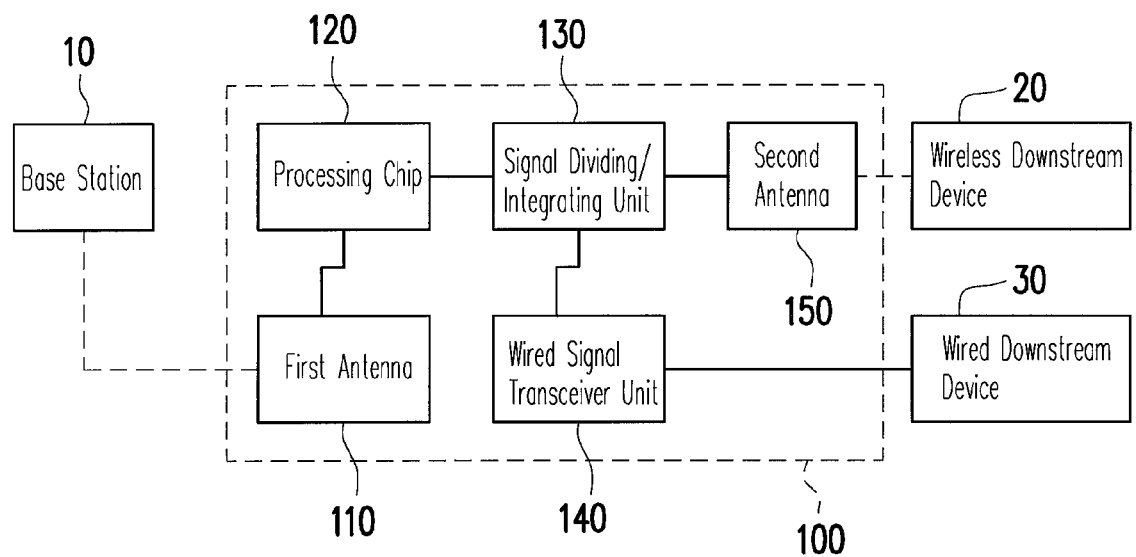
FIG. 1 is a block diagram illustrating a signal transforming and transmitting apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a signal transforming and transmitting apparatus according to an embodiment of the present invention. Referring to FIG. 1, it shows a signal transforming and transmitting apparatus 100. The signal transforming and transmitting apparatus 100 includes a first antenna 110, a processing chip 120, a signal dividing/integrating unit 130, a wired signal transceiver unit 140, and a second antenna 150. The first antenna 110 is coupled to the processing chip 120, and is adapted to communicate with a base station via a wireless network. The processing chip 120 is coupled to the signal dividing/integrating unit 130. The signal dividing/integrating unit 130 is coupled with both of the wired transceiver unit 140 and the second antenna 150. The wired transceiver unit 140 is adapted to communicate with a wired downstream device 30. The second antenna is adapted to communicate with a wireless downstream device 20 via the wireless network. The wireless network for example is a worldwide interoperability for microwave access (WiMAX) wireless network, a 3G wireless network, a 3.5G wireless network, or a long term evolution (LTE) wireless network. The wired network for example is an Ethernet network.

In the current embodiment, the processing chip 120 is adapted for outputting a clock signal, and defining a signal-download period and a signal-upload period according to the clock signal. Specifically, the processing chip 120 can define a former semi-period of the clock signal as the signal-download period, and defines a latter semi-period of the clock signal as the signal-upload period. Otherwise, the processing chip 120 can define the former semi-period of the clock signal as the signal-upload period, and defines the latter semi-period of the clock signal as the signal-download period.

Figure 2A:
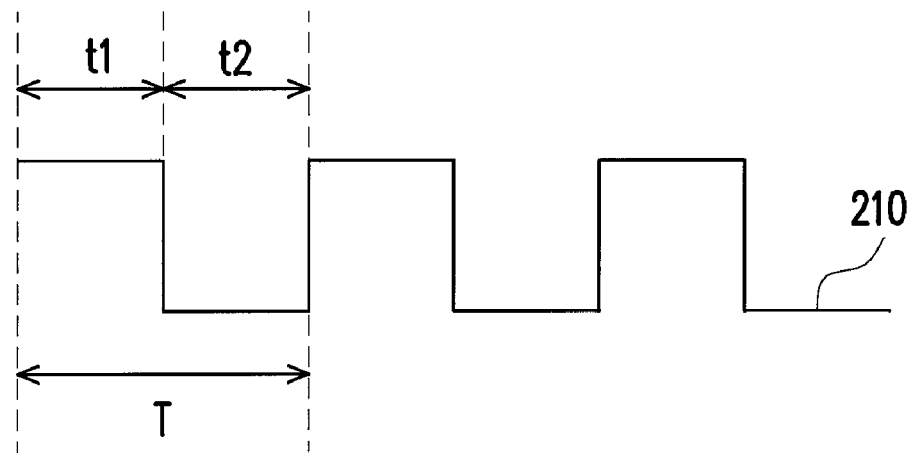
FIGS. 2A and 2B are waveforms of clock signals provided according to embodiments of the present invention.

FIG. 2A is a waveform of a clock signal provided according to an embodiment of the present invention. Referring to FIGS. 1 and 2A together, each period T of a clock signal 210 can be divided into a former semi-period t1 and a latter semi-period t2, positioned at a high voltage level and a low voltage level, respectively. Supposing the processing chip 120 defines the former semi-period t1 as the signal-download period, and defines the latter semi-period t2 as the signal-upload period. According to the clock signal 210 as shown in FIG. 2A, the signal transforming and transmitting apparatus 100 will first enter the signal-download period, and then enter the signal-upload period, and likewise repeat in which the signal transforming and transmitting apparatus 100 enters the signal-download period during the former semi-period t1 of each clock signal 210, and enters the signal-upload period during the latter semi-period t2 of each clock signal 210. Similarly, if the processing chip 120 defines the former semi-period t1 as the signal-upload period, and defines the latter semi-period t2 as the signal-download period, the signal transforming and transmitting apparatus 100 will first enter the signal-upload period, and then enter the signal-download period, and so forth.

Figure 2B:
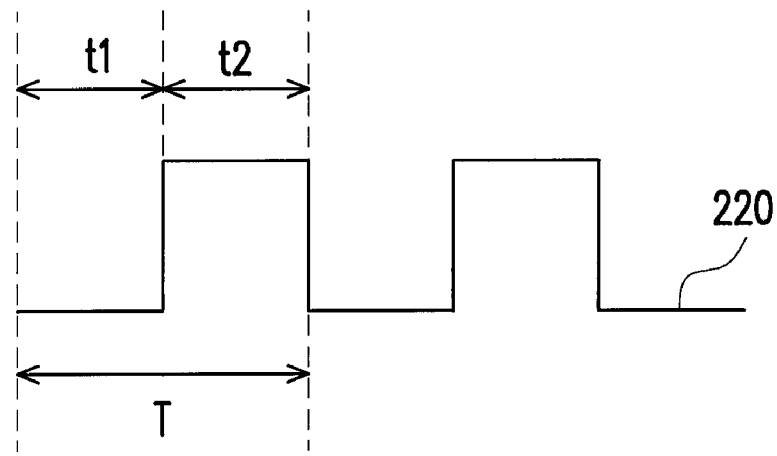

FIG. 2B is a waveform of a clock signal provided according to another embodiment of the present invention. Referring to FIGS. 1 and 2B together, each period T of a clock signal 220 can be divided into a former semi-period t1 at a low voltage level and a latter semi-period t2 at a high voltage level. The clock signal 220 differs from the clock signal 210 in that the former semi-periods t1 and the latter semi-periods t2 thereof have different voltage levels. However, despite the difference of voltage levels thereof, the processing chip 120 can define the former semi-period t1 or the latter semi-period t2 as the signal-download period, and define the rest semi-period as the signal-upload period. In other words, the voltage level does not restrict the scope of the present invention. Further, in accordance with the definition of the signal-download period and the signal-upload period made by the processing chip 120, the sequence of the signal transforming and transmitting apparatus 100 entering the signal-download period and the signal-upload period is same or similar with the embodiment corresponding to FIG. 2A, and is not to be iterated hereby.

Further referring to FIG. 1, it should be specifically clarified that in the current embodiment, when the signal transforming and transmitting apparatus 100 is first time connected to the base station 10, the base station 10 controls the processing chip 120 to set a proportion between lengths of the former semi-period and the latter semi-period according to a network transmission condition. A variation of the proportion between the lengths of the former semi-period and the latter semi-period will further affect a proportion between uploaded data amount and downloaded data amount.

During the signal-download period defined by the processing chip 120, the first antenna 110 receives a wireless downloading signal transmitted from the base station 10 via the wireless network. The processing chip 120 processes the received wireless downloading signal and transits the processed wireless downloading signal to the signal dividing/integrating unit 130. The signal dividing/integrating unit 130 divides a wired downloading signal from the wireless downloading signal. Then, the second antenna transmits the wireless downloading signal to the wireless downstream device 20 via the wireless network, and the wired signal transceiver unit 140 transmits the wired downloading signal divided from the wireless downloading signal to the wired downstream device 30. In the current embodiment, the wireless downstream device 20 for example is a mobile phone, or a computer system equipped with a wireless network card, which is not restricted by the present invention. The wired downstream device 30 is a device connected by a real wiring layout, and is also not restricted by the present invention.

In the current embodiment, the signal dividing/integrating unit 130 is adapted for transmitting the wireless downloading signal to the corresponding downstream devices, according the connection status of each of the downstream devices. In other words, only when the wireless downstream device 20 is being connected with the second antenna 150, would the signal dividing/integrating unit 130 transmit the wireless downloading signal to the wireless downstream device 20. Only when the wired downstream device 30 is being connected with the wired signal transceiver unit 140, would the signal dividing/integrating unit 130 transmit the wired downloading signal to the wired downstream device 30. In such a way, the signal transforming and transmitting apparatus 100 is adapted to receive the wireless downloading signal from the base station during the predefined signal-download period, and divide the wireless downloading signal into the wireless downloading signal and the wired downloading signal, and transmits the wireless downloading signal and the wired downloading signal respectively to the wireless downstream device 20 or the wired downstream device 30 which is being connected.

Further, during the signal-upload period defined by the processing chip 120, the signal dividing/integrating unit 130 receives the wireless uploading signal transmitted from the wireless downstream device 20 via the second antenna 150, and receives the wired uploading signal transmitted from the wired downstream device 30 via the wired signal transceiver 140. Then, the signal dividing/integrating unit 130 integrates the wired uploading signal and the wireless uploading signal into an integrated wireless uploading signal. After being processed by the processing chip 120, e.g., packaging, the integrated wireless uploading signal is transmitted to the base station 10 via the first antenna 110.

In the current embodiment, during the signal-download period defined by the processing chip 120 according to the clock signal, the signal dividing/integrating unit 130 receives the wireless downloading signal transmitted from the base station 10, and executes an action of downwardly transmitting data. During the signal-upload period defined by the processing chip 120, the signal dividing/integrating unit 130 integrates the wireless uploading signal and the wired uploading signal transmitted from the downstream devices and transmits back to the base station 10. When the signal dividing/integrating unit 130 clearly understand when to receive the wireless downloading signal, and when to transmit the wireless uploading signal, the present invention is capable of using one apparatus to achieve conversions of transforming wireless signals to wired signals and transforming wireless signals to wireless signals, so as to satisfy different demands of the users.

Figure 3:
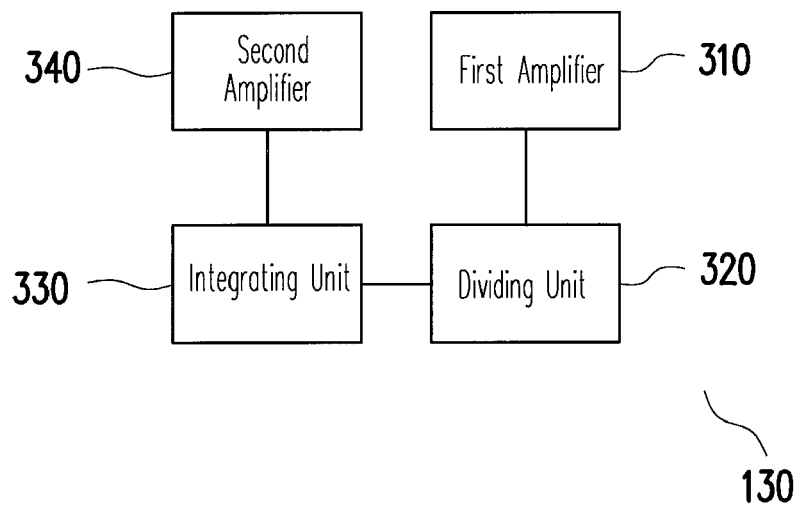
FIG. 3 is a block diagram illustrating a signal dividing/integrating unit of FIG. 1.

Details are to be given below for illustrating the application of the signal dividing/integrating unit 130, and for further illustrating how does the signal dividing/integrating unit 130 works to divide the wired downloading signal from the wireless downloading signal, and integrate the wired uploading signal and the wireless uploading signal. FIG. 3 is a block diagram illustrating a signal dividing/integrating unit of FIG. 1. Referring to FIG. 3, the signal dividing/integrating unit 130 includes a first amplifier 310, a dividing unit 320, an integrating unit 330, and a second amplifier 340. In the current embodiment, the first amplifier 310 for example is a low noise amplifier (LNA), and the second amplifier 340 for example is a power amplifier (PA).

Referring to FIGS. 1 and 3 together, when the signal dividing/integrating unit 130 receives a wireless downloading signal transmitted from the base station 10 during the signal-download period, the first amplifier 310 amplifies the received wireless downloading signal and transmits the amplified wireless downloading signal to the dividing unit 320. Then, the dividing unit 320 divides a wired downloading signal from the amplified wireless downloading signal, and transmits the wired downloading signal to the wired downstream device 30 via the wired signal transceiver unit 140. Further, the dividing unit 320 also transmits the wireless downloading signal to the integrating unit 330. The integrating unit 330 transmits the wireless downloading signal to the second amplifier 340 for further amplifying thereby. After being amplified by the second amplifier 340, the wireless downloading signal is then transmitted via the second antenna 150 to the wireless downstream device 20.

During the signal-upload period, when the signal dividing/integrating unit 130 receives the wireless uploading signal transmitted from the wireless downstream device 20 and the wired uploading signal transmitted from the wired downstream device 30, the first amplifier 310 amplifies the wireless uploading signal, and then the dividing unit 320 transmits the amplified wireless uploading signal to the integrating unit 330. The wired uploading signal transmitted from the wired downstream device 30 is also transmitted by the wired signal transceiver 140 to the integrating unit 330. The integrating unit 330 then integrates the wired uploading signal and the amplified wireless uploading signal to obtain an integrated wireless uploading signal. The second amplifier 340 then amplifies the integrated wireless uploading signal again, and thereafter the first antenna 110 transmits the wireless uploading signal to the base station 10.

In the signal dividing/integrating unit 130, the dividing unit 320 and the integrating unit 330 share the first amplifier 310 and the second amplifier 340. Therefore, the signal transforming and transmitting apparatus 100 of the present invention can simultaneously achieve the signal transforming function of the commercialized repeater and the signal enhancement function of the commercialized modem.

With respect to the foregoing disclosed concepts, the present invention further provides a method flow, according to which the signal transforming and transmitting apparatus 100 can be used to execute functions of a repeater and a modem at the same time. An embodiment is to be given below for illustration in more details.

Figure 4:
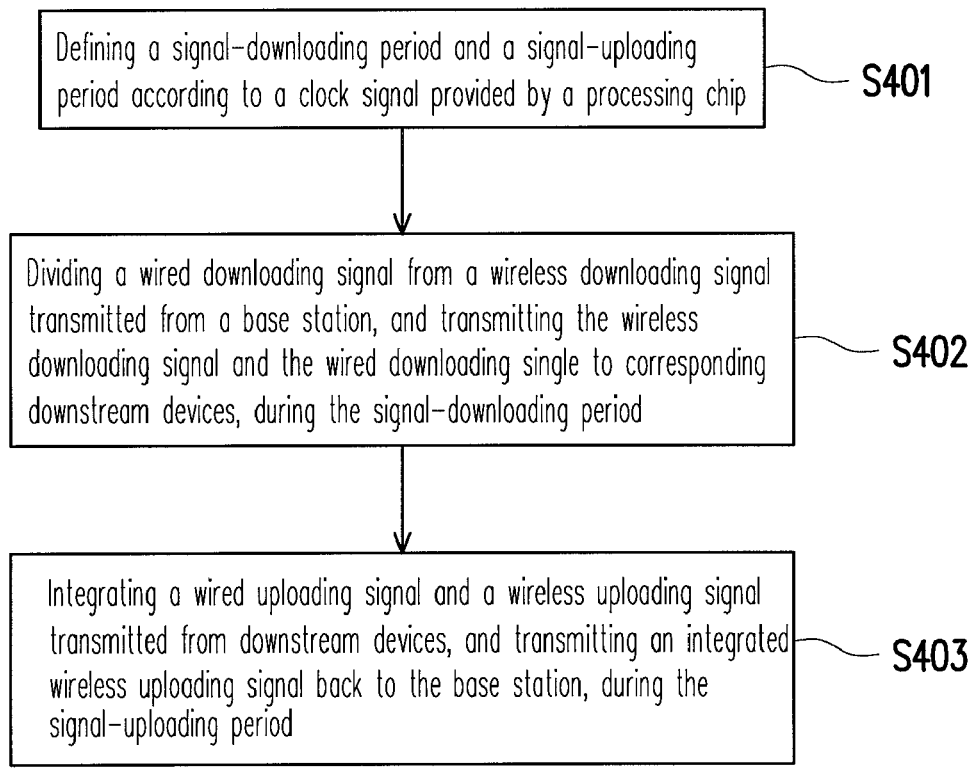
FIG. 4 is a flow chart illustrating a signal transforming and transmitting method according to an embodiment of the present invention.

FIG. 4 is a flow chart illustrating a signal transforming and transmitting method according to an embodiment of the present invention. Referring to FIGS. 1 and 4 together, the present invention provides a signal transforming and transmitting method for transforming and transmitting signals between the base station 10, the wired downstream device 30 and the wireless downstream device 20. The signal transforming and transmitting method includes the following steps. First at step S401, the processing chip 120 defines a signal-download period and a signal-upload period, according to a clock signal generated by the processing chip 120. When the signal transforming and transmitting apparatus 100 is first time connected to the base station 10, the base station 10 controls the processing chip 120 to set a proportion between lengths of a former semi-period and a latter semi-period according to a network transmission condition. For convenience of illustration, it is assumed that the processing chip 120 defines the former semi-period as the signal-download period, and defines the latter semi-period as the signal-upload period. Accordingly, the signal transforming and transmitting apparatus 100 enters the signal-download period whenever the clock signal is in the former semi-period, and enters the signal-upload period whenever the clock signal is in the latter semi-period.

Supposing that the signal transforming and transmitting apparatus firstly enters the signal-download period, then at step S402, the signal transforming and transmitting apparatus 100 receives the wireless downloading signal transmitted from the base station 10, and the signal dividing/integrating unit 130 divides a wired downloading signal from the received wireless downloading signal, and respectively transmits the wireless downloading signal and the wired downloading signal to corresponding downstream devices. The processes of dividing the wired downloading signal by the signal dividing/integrating unit 130 and transmitting the divided signals to the corresponding downstream devices are same or similar with the foregoing illustrated embodiments, and are not to be iterated hereby.

When the clock signal is in the latter semi-period, and the signal transforming and transmitting apparatus 100 enters signal-upload period, at step S403, the signal dividing/integrating unit 130 performs an integration process to the wired uploading signal and the wireless uploading signal received by the signal transforming and transmitting apparatus 100 to obtain an integrated wireless uploading signal, and then transmits the integrated wireless uploading signal back to the base station 10. Similarly, the integration process and the transmittance back of the integrated wireless uploading signal performed by the signal dividing/integrating unit 130 are same or similar with the foregoing illustrated embodiments, and are not to be iterated hereby.

The signal transforming and transmitting apparatus 100 repeatedly and alternatively enters the signal-download period and the signal-upload period. Therefore, after the step S403, the flow of the signal transforming and transmitting method turns back to the step S402, and once again receives a wireless downloading signal transmitted from the base station 10 during the signal-download period, and transmits a wireless uploading signal back to the base station 10 during the signal-upload period.

In another embodiment of the present invention, if the processing chip 120 defines the former semi-period of the clock signal as the signal-upload period, and defines the latter semi-period of the clock signal as the signal-download period, the signal transforming and transmitting apparatus 100 will repeatedly and alternatively integrate signals transmitted from the downstream devices into an integrated wireless uploading signal and transmits the integrated wireless uploading signal to the base station, and then receives the wireless downloading signal transmitted from the base station 10 and divide and transmits the received downloading signal to the downstream devices, in an order of signal uploading and signal downloading.

In the foregoing embodiments, the wireless downloading signal and the wireless uploading signal can be but are not restricted to be a worldwide interoperability for microwave access (WiMAX) wireless network signal, a 3G wireless network signal, a 3.5G wireless network signal, or a long term evolution (LTE) wireless network signal. Further, the wired downloading signal and the wired uploading signal can be but is not restricted to be an Ethernet network signal.

In summary, the signal transforming and transmitting apparatus and the method according to the present invention define a signal-download period and a signal-upload period according to a clock signal provided by a processing chip, and divides a wireless downloading signal during the signal-download period, and integrates signals to transmit back to the base station during the signal-upload period. In such a way, by defining the signal-download period and the signal-upload period the present invention avoids the interference caused by overlaps between uploading and downloading operations. Therefore, the present invention is adapted for use a single signal transforming and transmitting apparatus to achieve functions of a repeater and a modem at the same time, thus improving the convenience of using the wireless network.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal transforming and transmitting apparatus, comprising:
a processing chip, defining a signal-download period and a signal-upload period according to a clock signal; and
a signal dividing/integrating unit, coupled to the processing chip,
wherein the signal dividing/integrating unit is adapted for
dividing a wired downloading signal from a wireless downloading signal transmitted from a base station, and transmitting the wireless downloading signal and the wired downloading signal to corresponding downstream devices respectively, during the signal-download period; and
integrating a wired uploading signal and a wireless uploading signal transmitted from the downstream devices into an integrated wireless uploading signal and transmitting the integrated wireless uploading signal to the base station, during the signal-upload period.

2. The signal transforming and transmitting apparatus according to claim 1, wherein the processing chip defines one of a former semi-period and a latter semi-period of the clock signal as the signal-download period, and defines another one of the former semi-period and the latter semi-period of the clock signal as the signal-upload period.

3. The signal transforming and transmitting apparatus according to claim 2, wherein the base station is adapted for controlling the processing chip to adjust a proportion between lengths of the former semi-period and the latter semi-period of the clock signal, according to a network transmission condition.

4. The signal transforming and transmitting apparatus according to claim 1, wherein the signal dividing/integrating unit is adapted for transmitting the wireless downloading signal and the wired downloading signal to the corresponding downstream devices, according to a connection status of each of the downstream devices.

5. The signal transforming and transmitting apparatus according to claim 1, wherein the downstream devices comprises at least one wireless downstream device and one wired downstream device, the signal transforming and transmitting apparatus further comprising:
a first antenna, adapted for communicating with the base station via a wireless network, for receiving the wireless downloading signal, and transmitting the integrated wireless uploading signal;
a second antenna, adapted for communicating with the wireless downstream device via the wireless network, for transmitting the wireless downloading signal and receiving the wireless uploading signal; and
a wired signal transceiver unit, adapted for communicating with the wired downstream device via a wired network for receiving the wired uploading signal, and transmitting the wired downloading signal.

6. The signal transforming and transmitting apparatus according to claim 5, wherein the signal dividing/integrating unit comprises:
a first amplifier;
a second amplifier;
a dividing unit, coupled to the first amplifier; and
an integrating unit, coupled to the dividing unit and the second amplifier,
wherein during the signal-download period,
the first amplifier amplifies the wireless downloading signal;
the dividing unit divides the wired downloading signal from the amplified wireless downloading signal;
the wired signal transceiver unit transmits the wired downloading signal to the wired downstream device;
the integrating unit transmits the wireless downloading signal to the second amplifier for amplifying; and
the second antenna transmits the wireless downloading signal to the wireless downstream device; and
during the signal-upload period, the first amplifier amplifies the wireless uploading signal;
the dividing unit transmits the amplified wireless uploading signal to the integrating unit;
the integrating unit integrates the wired uploading signal and the amplified wireless uploading signal into an integrated wireless uploading signal; and the second amplifier amplifies the integrated wireless uploading signal, and transmits the amplified integrated wireless uploading signal to the base station via the first antenna.

7. The signal transforming and transmitting apparatus according to claim 6, wherein the first amplifier comprises a low noise amplifier (LNA).

8. The signal transforming and transmitting apparatus according to claim 6, wherein the second amplifier comprises a power amplifier (PA).

9. The signal transforming and transmitting apparatus according to claim 5, wherein the wireless network comprises one of a worldwide interoperability for microwave access (WiMAX) wireless network, a 3G wireless network, a 3.5G wireless network, or a long term evolution (LTE) wireless network.

10. The signal transforming and transmitting apparatus according to claim 5, wherein the wired network comprises an Ethernet network.

11. A signal transforming and transmitting method, for receiving and transmitting signals between a base station and at least one downstream device, the signal transforming and transmitting method comprising:
defining a signal-download period and a signal-upload period according to a clock signal provided by a processing chip;
dividing a wired downloading signal from a wireless downloading signal transmitted from the base station, and transmitting the wired downloading signal and the wireless downloading signal to corresponding downstream devices, during the signal-download period;
integrating a wired uploading signal and a wireless uploading signal transmitted from the downstream devices into an integrated wireless uploading signal, and transmitting the integrated wireless uploading signal back to the base station, during the signal-upload period.

12. The signal transforming and transmitting method according to claim 11, wherein the step of defining the signal-download period and the signal-upload period according to the clock signal provided by the processing chip comprises:
defining one of a former semi-period and a latter semi-period of the clock signal as the signal-download period, and defining another one of the former semi-period and the latter semi-period of the clock signal as the signal-upload period.

13. The signal transforming and transmitting method according to claim 12, further comprising:
controlling the processing chip with the base station to adjust a proportion between lengths of the former semi-period and the latter semi-period of the clock signal, according to a network transmission condition.

14. The signal transforming and transmitting method according to claim 11, wherein the step of transmitting the wireless downloading signal and the wired downloading signal to the corresponding downstream devices is performed according to a connection status of each of the downstream devices.

15. The signal transforming and transmitting method according to claim 11, wherein the downstream devices comprises at least one wireless downstream device and one wired downstream device, during the signal-download period the signal transforming and transmitting method further comprising:
amplifying the wireless downloading signal with a low noise amplifier (LNA);
dividing the wired downloading signal from the amplified wireless downloading signal, and transmitting the wired downloading signal to the wired downstream device; and
amplifying the wireless downloading signal with a power amplifier (PA), and transmitting the amplified wireless downloading signal to the wireless downstream device.

16. The signal transforming and transmitting method according to claim 11, during the signal-upload period the signal transforming and transmitting method further comprising:
amplifying the wireless uploading signal with a low noise amplifier (LNA);
integrating the wired uploading signal with the amplified wireless uploading signal into an integrated wireless uploading signal; and
amplifying the integrated wireless uploading signal with a power amplifier (PA), and transmitting the amplified integrated wireless uploading signal to the base station.

17. The signal transforming and transmitting method according to claim 11, wherein the wireless downloading signal and the wireless uploading signal comprise one of a worldwide interoperability for microwave access (WiMAX) wireless network signal, a 3G wireless network signal, a 3.5G wireless network signal, and a long term evolution (LTE) wireless network signal.

18. The signal transforming and transmitting method according to claim 11, wherein the wired downloading signal and the wired uploading signal comprise Ethernet signals.

* * * * *